(12) United States Patent
Peterson

(10) Patent No.: US 10,793,061 B2
(45) Date of Patent: Oct. 6, 2020

(54) METHODS OF MOUNTING AN AUXILIARY LIGHTING SYSTEM TO A VEHICLE AND RELATED SYSTEMS

(71) Applicant: Honda Motor Co., Ltd., Tokyo (JP)

(72) Inventor: David G. Peterson, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/276,799

(22) Filed: Feb. 15, 2019

(65) Prior Publication Data

US 2020/0262334 A1 Aug. 20, 2020

(51) Int. Cl.
*B60Q 3/208* (2017.01)
*B60Q 1/26* (2006.01)
*B60R 16/03* (2006.01)

(52) U.S. Cl.
CPC ............ *B60Q 1/2611* (2013.01); *B60Q 3/208* (2017.02); *B60R 16/03* (2013.01); *B60Q 2900/10* (2013.01)

(58) Field of Classification Search
USPC ......................................................... 340/468
See application file for complete search history.

(56) References Cited

U.S. PATENT DOCUMENTS

| | | | | |
|---|---|---|---|---|
| 3,913,971 A | * | 10/1975 | Green | B60J 7/11 296/218 |
| 4,351,560 A | * | 9/1982 | Kanou | B60J 7/11 296/218 |
| 4,934,752 A | * | 6/1990 | Bryant | B60Q 1/2611 296/210 |
| 7,261,447 B2 | | 8/2007 | Menke et al. | |
| 7,798,565 B2 | * | 9/2010 | Johl | B60R 13/0206 296/210 |
| 9,409,528 B1 | | 8/2016 | Datz | |
| 9,975,473 B2 | | 5/2018 | Wittorf et al. | |
| 2007/0194903 A1 | | 8/2007 | Walasik | |
| 2018/0050633 A1 | | 2/2018 | Terai et al. | |

FOREIGN PATENT DOCUMENTS

| | | |
|---|---|---|
| CN | 107816671 A | 3/2018 |
| DE | 102011003697 A1 | 8/2012 |
| DE | 102015015371 A1 | 5/2016 |
| DE | 102016122012 A1 | 5/2018 |

* cited by examiner

*Primary Examiner* — Brent Swarthout
(74) *Attorney, Agent, or Firm* — Armstrong Teasdale LLP

(57) ABSTRACT

A vehicle that includes a roof panel including a moonroof opening and a rim extending about the moonroof opening is described herein. The rim includes a lower edge. At least two brackets are coupled to the roof panel, and each bracket includes a first end that defines a hook portion and a second end that defines a mounting portion. The hook portion is coupled to the lower edge of the rim such that the mounting portion extends through the moonroof opening. A support member is coupled to the mounting portion of the brackets, wherein a portion of the support member is oriented to couple to the roof panel, and a fastener is coupled to the brackets and the support member such that the hook portion is secured to the rim and the support member is secured to the roof panel. An auxiliary lighting system is at least one of included at least partially within or coupled to the support member.

19 Claims, 7 Drawing Sheets

METHODS OF MOUNTING AN AUXILIARY LIGHTING SYSTEM TO A VEHICLE AND RELATED SYSTEMS

BACKGROUND

The present disclosure relates generally to vehicle accessories and, more specifically, to systems and methods of mounting an auxiliary lighting system to a roof of a vehicle having a moonroof.

There are known vehicles, typically sport utility vehicles (SUVs) and/or off-road type vehicles, that include auxiliary lighting systems installed thereon by a dealer or car manufacturer, or installed aftermarket by a customer, for example. The installation process often requires drilling holes in the body or the A-pillars of the vehicle to enable attachment of one or more brackets to the vehicle. The auxiliary lighting system is then coupled to the brackets. The drilling and attachment process is time-consuming, laborious, irreversible in that holes remain present even if the accessory brackets are removed, and may adversely impact the strength of body components of the vehicle. Moreover, when performed in a factory setting by the car manufacturer, the installation process increases the number of body variations on the vehicle that must be controlled, which increases the cost and complexity of assembling the vehicle.

BRIEF DESCRIPTION

In one aspect, a vehicle is provided. The vehicle includes a roof panel including a moonroof opening and a rim extending about the moonroof opening. The rim includes a lower edge. At least two brackets are coupled to the roof panel, and each bracket includes a first end that defines a hook portion and a second end that defines a mounting portion. The hook portion is coupled to the lower edge of the rim such that the mounting portion extends through the moonroof opening. A support member is coupled to the mounting portion of the at least two brackets, wherein a portion of the support member is oriented to couple to the roof panel, and a fastener is coupled between the at least two brackets and the support member such that the hook portion is secured to the rim and the support member is secured to the roof panel. An auxiliary lighting system is at least one of included at least partially within or coupled to the support member.

In another aspect, a method of mounting an auxiliary lighting system to a vehicle including a roof panel having a moonroof opening and a rim extending about the moonroof opening is provided. The method includes coupling at least two brackets to the roof panel, wherein each bracket includes a first end that defines a hook portion and a second end that defines a mounting portion. The hook portion is coupled to a lower edge of the rim such that the mounting portion extends through the moonroof opening. The method also includes coupling a support member to the mounting portion of the at least two brackets, the support member including at least one leg member oriented to couple to the roof panel, coupling a fastener between the at least two brackets and the support member, tightening the fastener such that the hook portion is secured to the rim and the support member is secured to the roof panel, and coupling the auxiliary lighting system to the support member.

In yet another aspect, a method of mounting an auxiliary lighting system to a vehicle including a roof panel having a moonroof opening and a rim extending about the moonroof opening is provided. The method includes coupling at least two brackets to the roof panel, and each bracket includes a first end that defines a hook portion and a second end that defines a mounting portion. The hook portion is coupled to a lower edge of the rim and the mounting portion extends through the moonroof opening. The method also includes coupling an auxiliary roof lighting system assembly to the mounting portion of the at least two brackets, the auxiliary roof lighting system assembly including at least one leg member oriented to couple to the roof panel, coupling a fastener between the at least two brackets and the auxiliary roof lighting system assembly, and tightening the fastener such that the hook portion is secured to the rim and the auxiliary roof lighting system assembly is secured to the roof panel.

DETAILED DESCRIPTION

The embodiments described herein relate generally to systems and methods of mounting an auxiliary lighting system to a roof of a vehicle having a moonroof. More specifically, the mounting system described herein is designed for integration with the moonroof of the vehicle such that permanent or destructive vehicle body modifications are not required for installation of the auxiliary lighting system on the vehicle. For example, in one embodiment, the mounting system includes brackets hooked onto a roof panel of the vehicle at the moonroof opening, and a support member coupled to the brackets and extending across the roof opening. When a fastener couples the brackets and the support member together, a tensioning equilibrium is formed therebetween with the brackets secured against a lower edge of the roof panel and the support member secured against an outer surface of the roof panel. An auxiliary lighting system is then coupled to, or lighting elements are already integrated with, the support member. The mounting system is wider than the moonroof opening so that it does not pass straight through the opening, but rather rests on the exterior of the vehicle. In addition, the system is rigid enough not to collapse under tension of the fasteners and/or vehicle motions and vibrations. As such, the auxiliary lighting system is mountable on the vehicle in a non-destructive and user-friendly manner.

Figure 1:
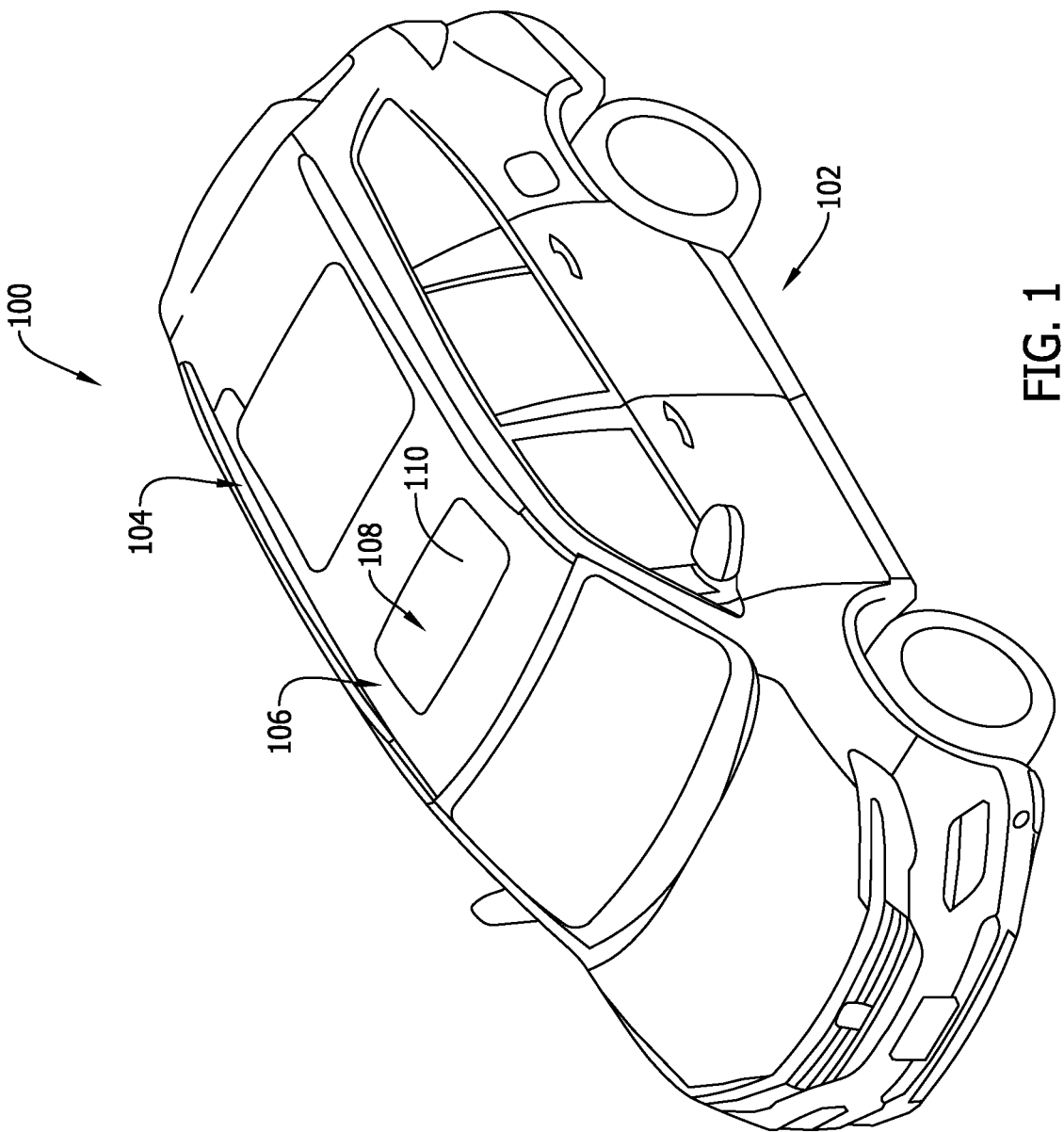
FIG. 1 is a perspective view of an exemplary vehicle.

FIG. 1 is a perspective view of an exemplary vehicle 100. In the exemplary embodiment, vehicle 100 includes a lower body 102 and a roof panel 104. Roof panel 104 includes a moonroof opening 106, and a moonroof system 108 for use in selectively covering and exposing moonroof opening 106. For example, moonroof system 108 includes a movable closure panel 110 sized to cover moonroof opening 106 when in a closed position, and configured to expose moonroof opening 106 when translated rearward into an open position. In one embodiment, movable closure panel 110 is fabricated from glass that is at least partially transparent.

Figure 2:
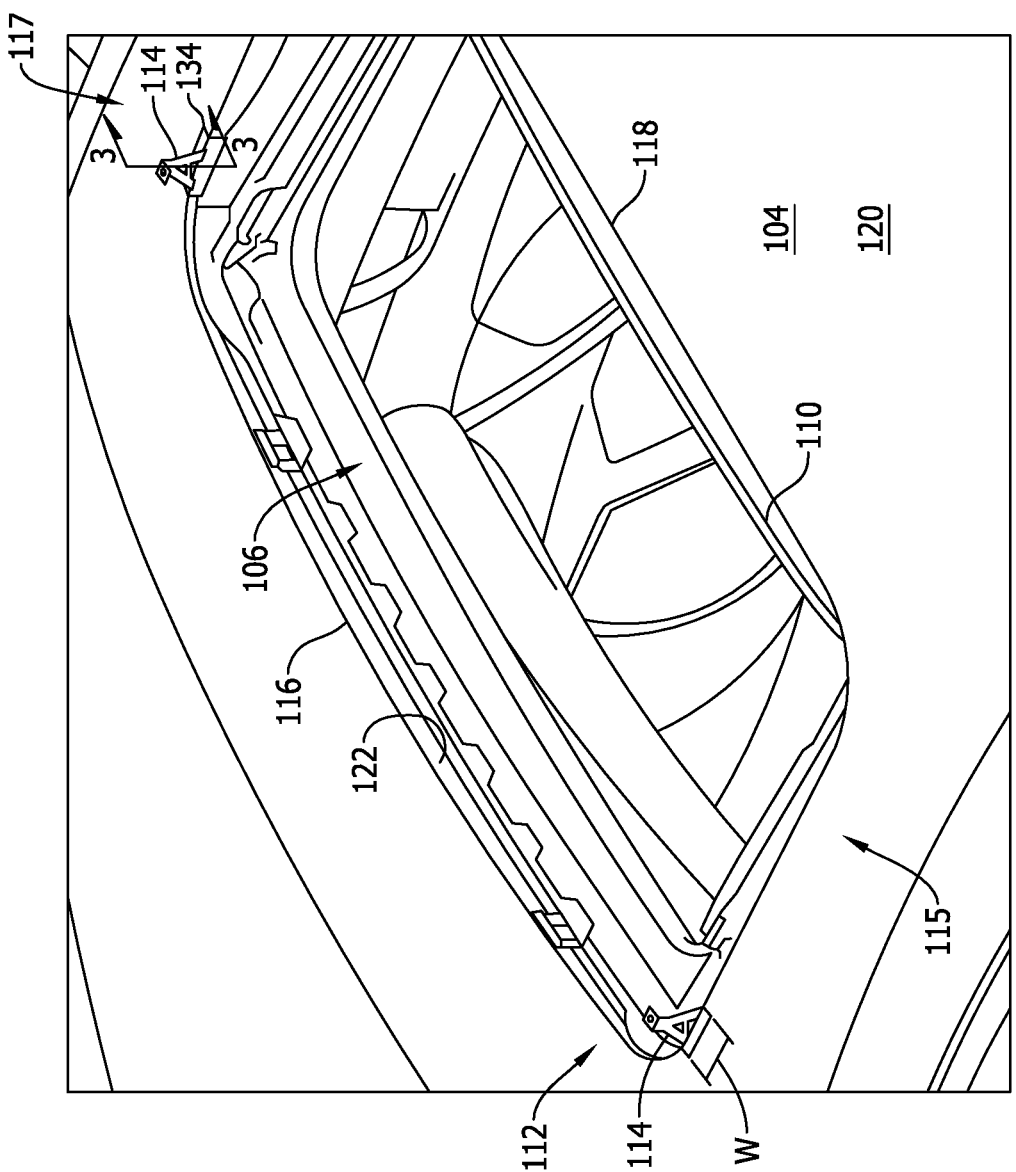
FIG. 2 illustrates an exemplary first process step for mounting an auxiliary lighting system to the vehicle shown in FIG. 1.
Figure 3:
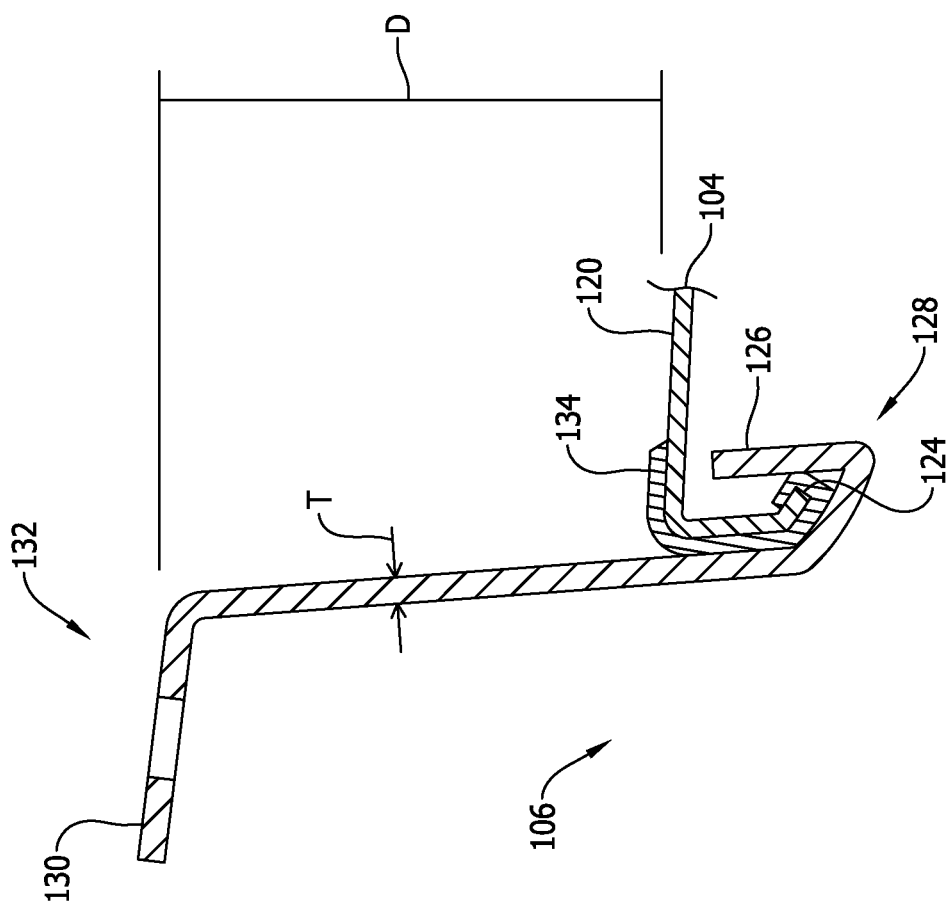
FIG. 3 is a cross-sectional view of the vehicle shown in FIG. 2 and taken along line 3-3 shown in FIG. 2.

FIG. 2 illustrates an exemplary first process step for mounting an auxiliary lighting system (not shown in FIG. 2) to vehicle 100 (shown in FIG. 1), and FIG. 3 is a cross-sectional view of vehicle 100 taken along line 3-3 (shown in FIG. 2). In the exemplary embodiment, the auxiliary lighting system is mounted to vehicle 100 with a mounting system 112. Mounting system 112 includes at least two brackets 114, and the first process step includes coupling brackets 114 to roof panel 104. Brackets 114 may be located at any position relative to moonroof opening 106 that enables mounting system 112 to function as described herein. In the exemplary embodiment, brackets 114 are positioned on opposing lateral sides 115, 117 of moonroof opening 106 closer to a leading edge 116 than a trailing edge 118 of moonroof opening 106.

Each bracket 114 includes a width W. When coupled to roof panel 104, bracket 114 is oriented such that width W extends lengthwise relative to vehicle 100. Width W is selected such that mounting system 112 can withstand forces applied to the auxiliary lighting system while remaining stationary relative to roof panel 104. Exemplary forces include wind, vehicle motions, such as acceleration and deceleration, and vibrations that are encountered during normal vehicle operation. In one embodiment, width W is greater than about 100 millimeters (mm).

Referring to FIGS. 2 and 3, in the exemplary embodiment, roof panel 104 includes an outer surface 120 and a rim 122. Rim 122 extends about, and at least partially defines, moonroof opening 106. Rim 122 also includes a lower edge 124 that is offset from, and positioned interior of, outer surface 120 of roof panel 104. In addition, in the exemplary embodiment, each bracket 114 includes a first end 126 that defines a hook portion 128 and a second end 130 that defines a mounting portion 132. When bracket 114 is coupled to roof panel 104, hook portion 128 is coupled to lower edge 124 of rim 122 and mounting portion 132 extends through moonroof opening 106. For example, hook portion 128 extends around lower edge 124 of rim 122, and mounting portion 132 extends a vertical distance D from outer surface 120. As such, hook portion 128 secures bracket 114 against rim 122 and mounting portion 132 is positioned to not impede movement of movable closure panel 110. In addition, bracket 114 may have any thickness T that enables movable closure panel 110 to function as described herein. For example, in the exemplary embodiment, the thickness T of bracket 114 is selected to be thin enough to enable movable closure panel 110 to close and to form a water-resistant seal against rim 122 when in the closed position. In one embodiment, the thickness T is less than about 1.0 mm. In addition to maintaining water-resistance, thickness T is selected to ensure that there are no unwanted wind, noise, or air leaks created.

In some embodiments, mounting system 112 also includes a first buffer pad 134 between each bracket 114 and rim 122. First buffer pad 134 facilitates protecting roof panel 104 from damage, such as that caused by direct coupling between mounting system 112 and vehicle 100. As such, first buffer pad 134 extends over a greater surface area across roof panel 104 than bracket 114, and extends around lower edge 124 of rim 122 and onto outer surface 120 of roof panel 104, such that no portion of bracket 114 is directly coupled to roof panel 104. First buffer pad 134 is configured to prevent bracket 114 from damaging paint on rim 122 and to prevent vibration and/or noise caused by interaction of bracket 114 and rim 122.

Figure 4:
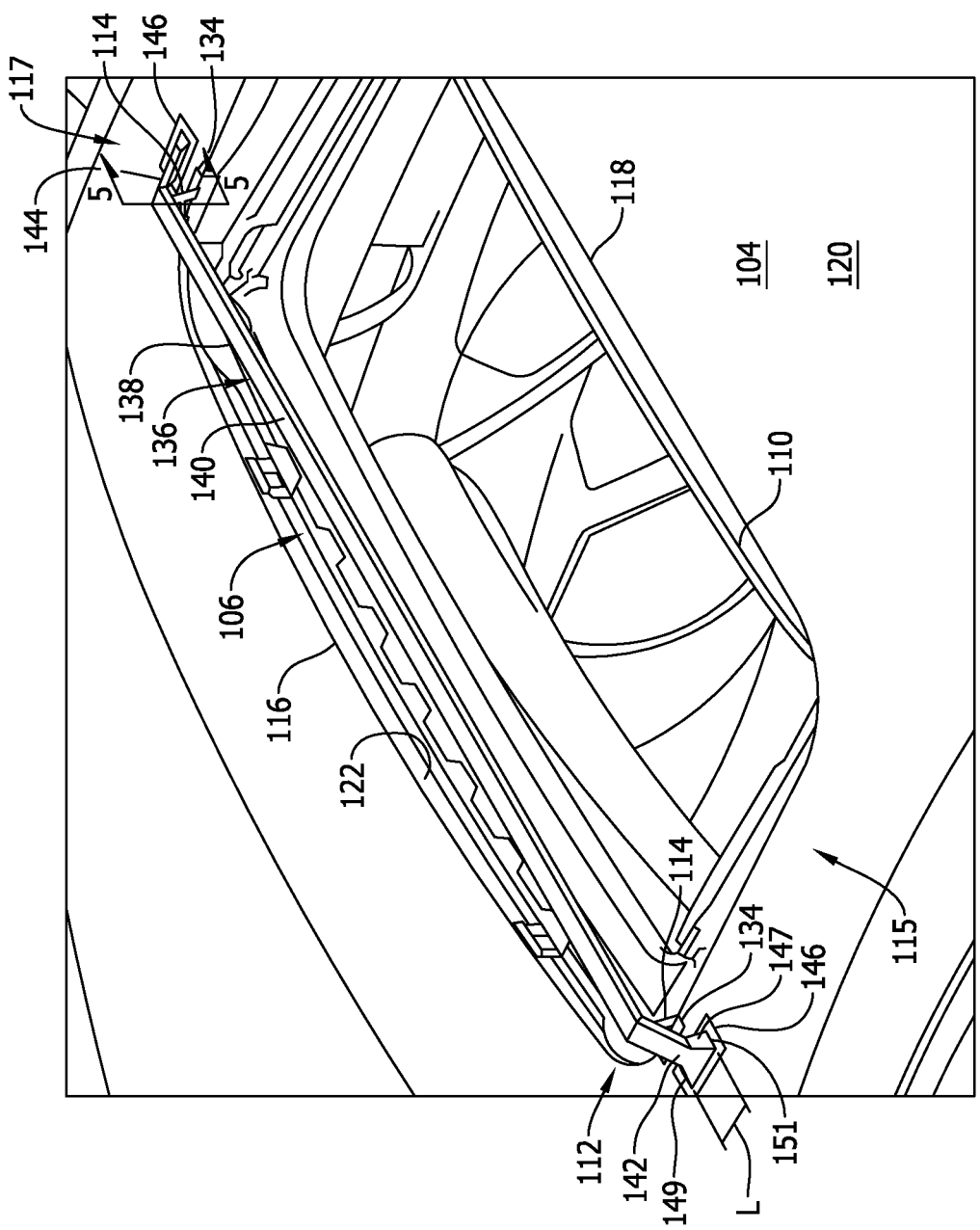
FIG. 4 illustrates an exemplary second process step for mounting an auxiliary lighting system to the vehicle.
Figure 5:
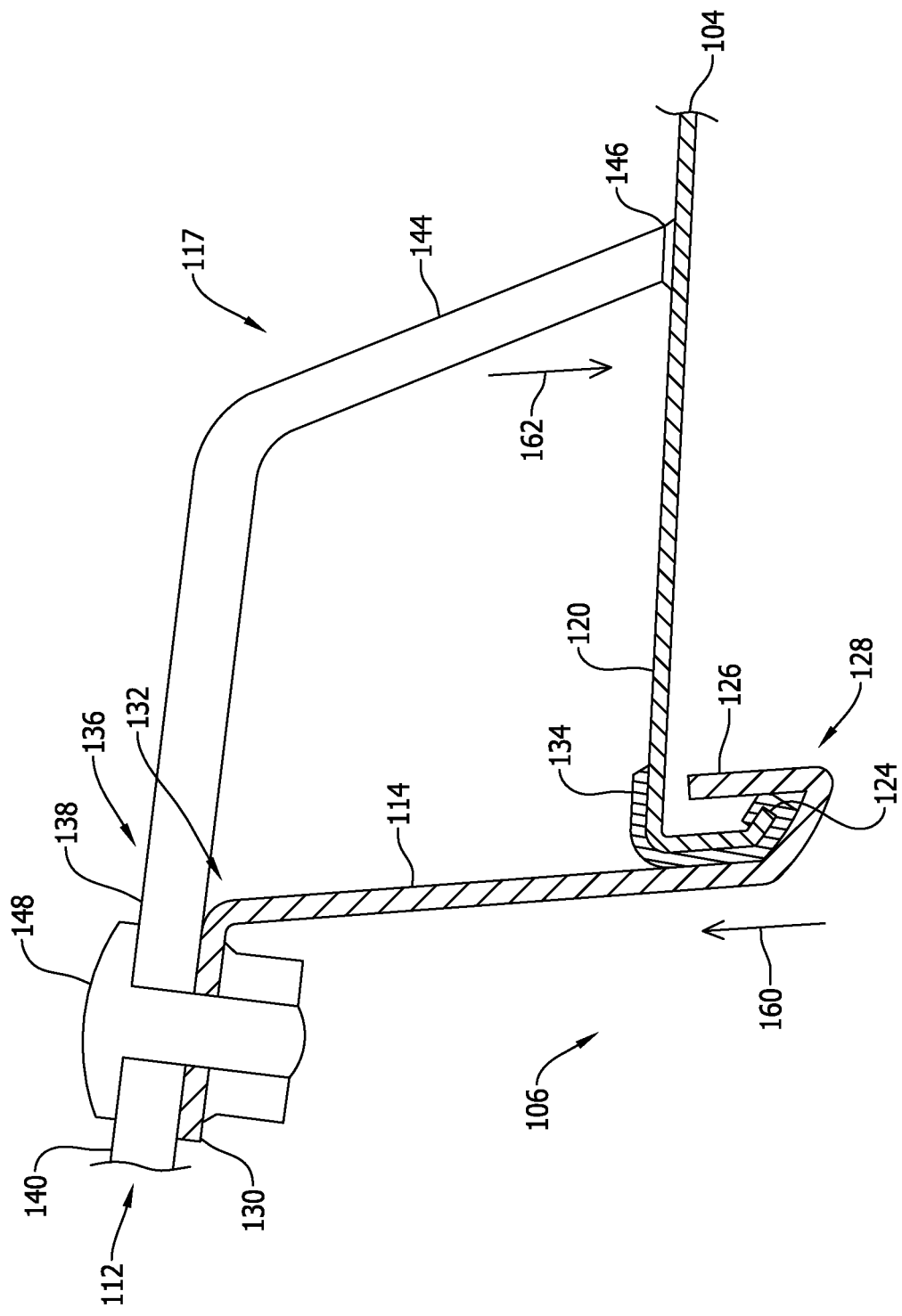
FIG. 5 is a cross-sectional view of the vehicle shown in FIG. 4 and taken along line 5-5 shown in FIG. 4.

FIG. 4 illustrates an exemplary second process step for mounting an auxiliary lighting system to the vehicle, and FIG. 5 is a cross-sectional view taken along line 5-5 (shown in FIG. 4). In the exemplary embodiment, mounting system 112 also includes a support member 136, and the second process step includes coupling support member 136 to mounting portions 132 of brackets 114. Support member 136 may be any rigid structure that enables mounting system 112 to function as described herein. For example, in one embodiment, support member 136 is an elongated rail 138 including a mounting surface 140 for receiving an auxiliary lighting system thereon. In an alternative embodiment, the auxiliary lighting system includes support member 136.

Referring to FIG. 4, a portion of support member 136 is configured to couple to outer surface 120 of roof panel 104 when mounting system 112 is in an installed position. For example, in the exemplary embodiment, elongated rail 138 includes a first leg member 142 and a second leg member 144 that are on opposing lateral sides 115, 117 of moonroof opening 106. Leg members 142 and 144 extend outwardly, beyond respective brackets 114 for coupling to roof panel 104. For example, leg members 142 and 144 are configured to press against outer surface 120 of roof panel 104. In addition, a second buffer pad 146 is between leg members 142 and 144 and roof panel 104 to facilitate protecting roof panel 104 from damage, such as that caused by rubbing and/or vibration potentially present between leg members 142, 144 and roof panel 104. In one embodiment, second buffer pad 146 is formed from a material that will not scratch and/or harm paint on roof panel 104 and may be securely coupled between roof panel 104 and leg members 142 and 144 with an adhesive that facilitates securing leg members 142 and 144 in a predetermined position relative to roof panel 104.

Each leg member 142 and 144 includes a base 147 coupled to roof panel 104. Base 147 includes a leading edge 149 and a trailing edge 151 that define a length L of base 147. Length L is selected such that mounting system 112 can withstand forces applied to the auxiliary lighting system while remaining stationary relative to roof panel 104. As noted above, exemplary forces include wind, vehicle motions, such as acceleration and deceleration, and vibrations that are encountered during normal vehicle operation. In one embodiment, length L is defined within a range between about 3 inches and about 12 inches, is defined within a range between about 5 inches and 9 inches, or is about 6 inches long.

Referring to FIG. 5, mounting system 112 also includes a fastener 148, such as a nut and bolt fastener, coupled between brackets 114 and support member 136. Fastener 148 may also include, but is not limited to, a snap and/or friction fit-type fastener, and/or any other type of fastener that allows mounting system 112 to function as described herein. Tightening fastener 148 facilitates securing hook portion 128 to rim 122 and securing support member 136 to roof panel 104 such that hook portion 128 and support member 136 are held in tensioning equilibrium. For example, tightening fastener 148 forces hook portion 128 substantially in a first direction 160 against lower edge 124 of rim 122, and forces leg members 142 and 144 (shown in FIG. 4) substantially in a second direction 162, opposite to first direction 160, and against outer surface 120 of roof panel 104. As such, the counteracting forces define the tensioning equilibrium for holding mounting system 112 in a predetermined position relative to roof panel 104.

Figure 6:
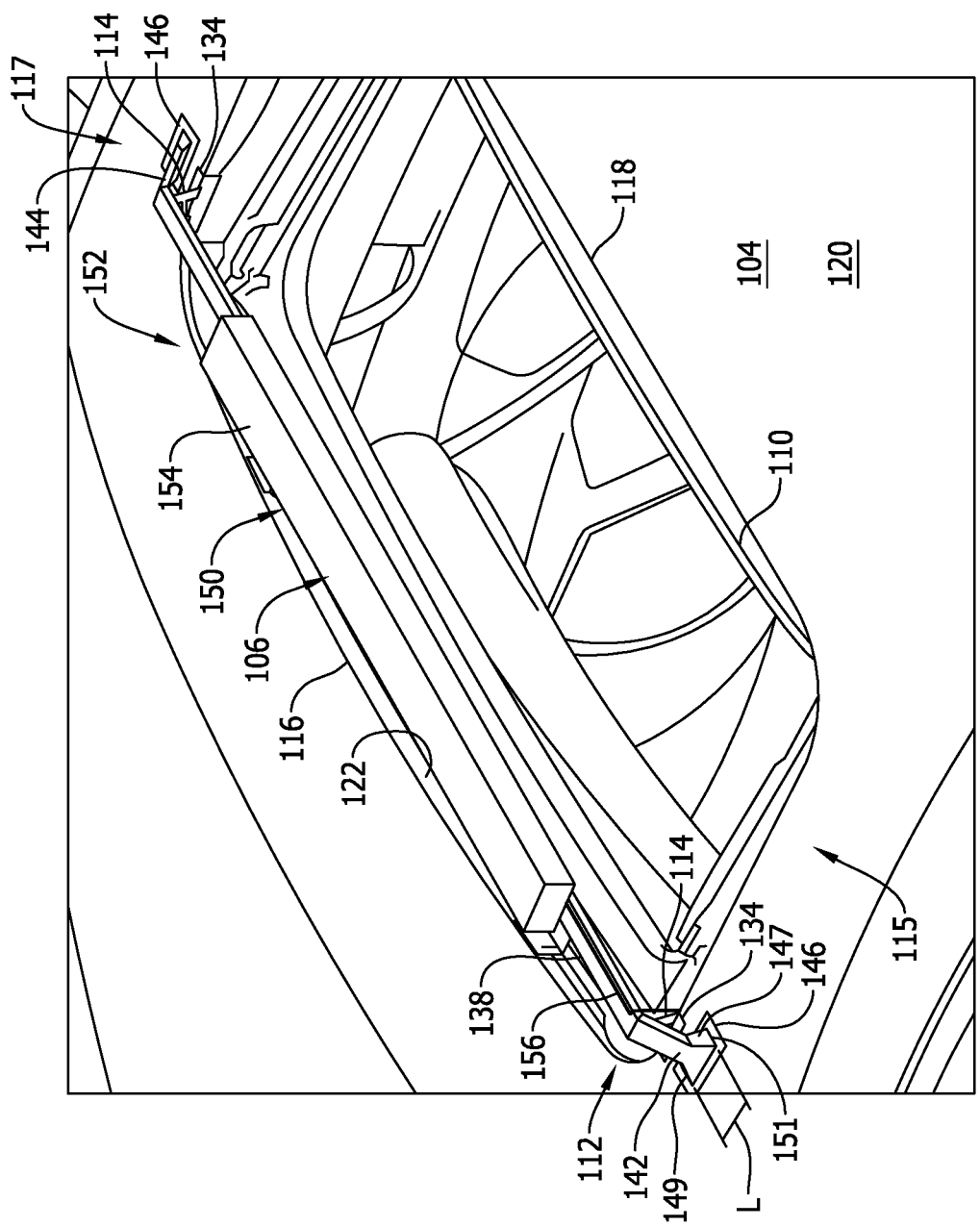
FIG. 6 illustrates an exemplary third process step for mounting an auxiliary lighting system to the vehicle.

Referring to FIG. 6, a vehicle accessory 150 is coupled to support member 136, thereby forming an auxiliary roof lighting system assembly 152. Vehicle accessory 150 is coupled to mounting surface 140 of support member 136, and secured to mounting surface 140 with any suitable fastener (not shown). Vehicle accessory 150 may be any aftermarket or factory-installable device such as, but not limited to, an auxiliary lighting system 154. As referred to herein, auxiliary lighting system 154 is any type of lighting positioned on the roof of vehicle 100. The auxiliary lighting system 154 may include a single light emitting element or a plurality of light emitting elements. The auxiliary lighting system 154 may also include reflectors and/or other components to aim the light produced by the light emitting elements. In some embodiments, the auxiliary lighting system 154 may also be referred to as a light bar. Furthermore, although illustrated as being coupled to support member 136, auxiliary lighting system 154 may be included at least partially within and/or integrally formed with support member 136.

In the exemplary embodiment, a length of electrical wire 156 is coupled to auxiliary lighting system 154. Electrical wire 156 couples vehicle accessory 150 with a power source (not shown) within vehicle 100. In addition, in the exemplary embodiment, electrical wire 156 has circumferentially asymmetric and/or substantially flat cross-sectional shape. As such, electrical wire 156 is dimensioned to not interfere with operation of movable closure panel 110 when routed through moonroof opening 106. In one embodiment, electrical wire 156 may be connected to a vehicle wire harness between outer surface 120 of roof panel 104 and a headliner (not shown) within vehicle 100. Thus, additional body modifications are not required for routing electrical wire 156, which reduces the need to control multiple roof panel variations in a factory setting, as well as eliminates another potential hole needed for aftermarket installation of a vehicle accessory.

Figure 7:
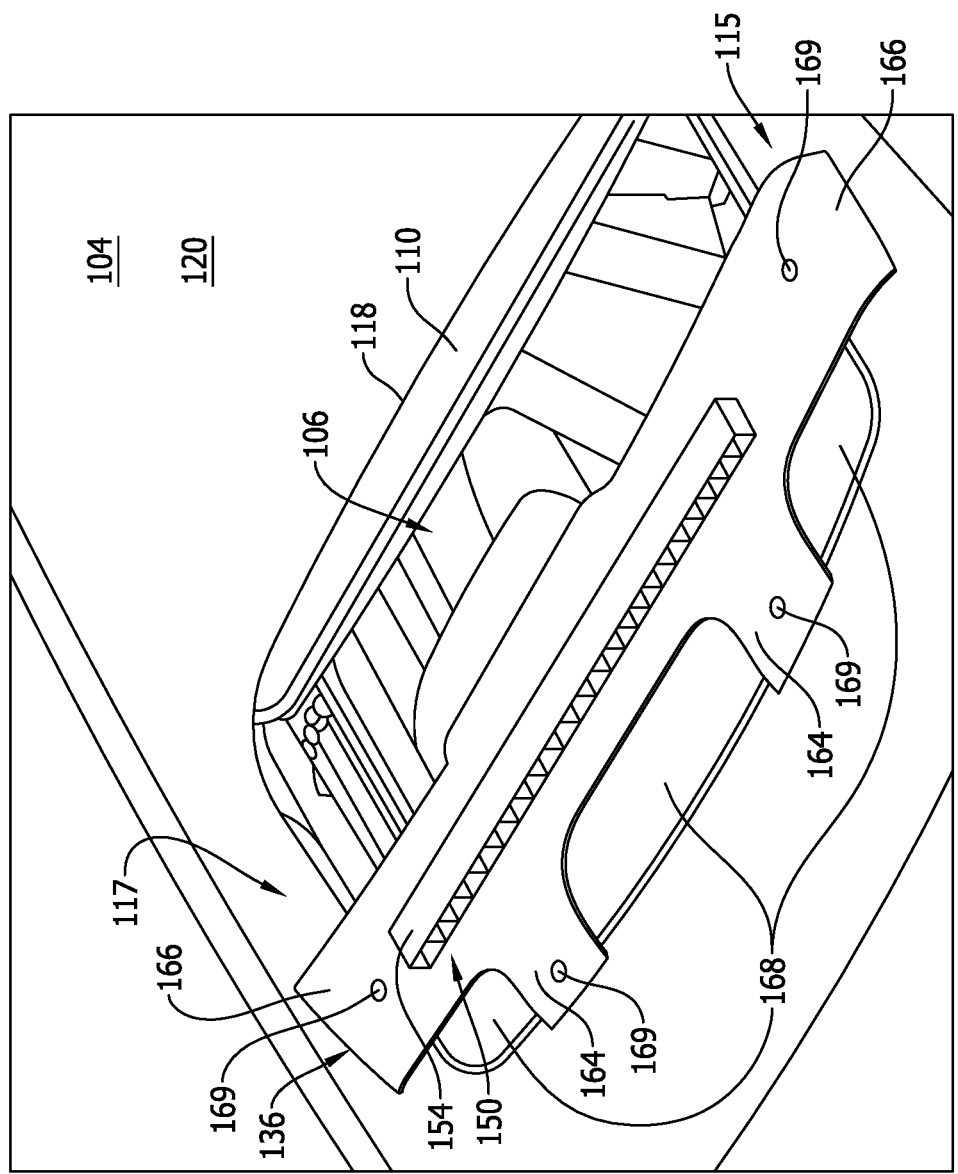
FIG. 7 illustrates an alternative auxiliary lighting mounting system on the vehicle shown in FIG. 1.

FIG. 7 illustrates an alternative auxiliary lighting mounting system 158 on vehicle 100 (shown in FIG. 1). In the alternative embodiment, support member 136 has front support legs 164 positioned in front of leading edge 116 (shown in FIG. 2) of moonroof opening 106, and side support legs 166 positioned on opposing lateral sides 115, 117 of moonroof opening 106. Airflow openings 168 are defined between adjacent legs 164 and 166. Airflow openings 168 facilitate reducing wind resistance when vehicle 100 is in motion. In an alternative embodiment, support member 136 is positioned at any location at or between leading edge 116 and trailing edge 118 of moonroof opening 106.

Each of front support legs 164 and side support legs 166 are coupled to roof panel 104 with its own bracket 114 (shown in FIG. 2), such that mounting system 158 includes four brackets 114 spaced from each other about moonroof opening 106. Support member 136 is coupled to each bracket 114 with a fastener 169 that facilitates holding support member 136 and brackets 114 in tensioning equilibrium when tightened. In an alternative embodiment, support member 136 may be coupled to roof panel 104 with any number of brackets 114 and fasteners 169 that enables mounting system 158 to function as described herein.

The embodiments described herein relate to systems and methods of mounting an auxiliary lighting system to a vehicle in a manner that facilitates reducing the complexity of the installation process while also preserving the aesthetics and structural integrity of the vehicle. The systems and methods described herein accomplish the aforementioned objectives by utilizing a moonroof opening to secure the auxiliary lighting system to the vehicle. As such, the auxiliary lighting system is mountable on the vehicle in a non-destructive and user-friendly manner.

Exemplary embodiments of an auxiliary lighting mounting system and related methods of use are described above in detail. Although the systems herein described and illustrated in association with a motor vehicle, the invention is also intended for use on any means of conveyance including a roof opening. Moreover, it should also be noted that the components of the invention are not limited to the specific embodiments described herein, but rather, aspects of each component may be utilized independently and separately from other components and methods of assembly described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle comprising:
a roof panel comprising a moonroof opening and a rim extending about the moonroof opening, the rim comprising a lower edge;
at least two brackets coupled to the roof panel, each bracket comprises a first end that defines a hook portion and a second end that defines a mounting portion, the hook portion coupled to the lower edge of the rim such that the mounting portion extends through the moonroof opening;
a support member coupled to the mounting portion of the at least two brackets, wherein a portion of the support member is oriented to couple to the roof panel;
a fastener coupled between the at least two brackets and the support member, the fastener configured to hold the at least two brackets and the support member in tensioning equilibrium such that the hook portion is secured to the rim and the support member is secured to the roof panel; and
an auxiliary lighting system at least one of included at least partially within or coupled to the support member.

2. The vehicle in accordance with claim 1 further comprising a first buffer pad between each bracket and the rim.

3. The vehicle in accordance with claim 1 further comprising a second buffer pad between the portion of the support member and the roof panel.

4. The vehicle in accordance with claim 1, wherein a first bracket and a second bracket of the at least two brackets are positioned on opposing lateral sides of the moonroof opening.

5. The vehicle in accordance with claim 1 further comprising a length of electrical wire coupled to the auxiliary lighting system, wherein the electrical wire has a circumferentially asymmetric or flat cross-sectional shape.

6. The vehicle in accordance with claim 1, wherein the support member is an elongated rail.

7. The vehicle in accordance with claim 6, wherein the elongated rail comprises a first leg member and a second leg member positioned on opposing lateral sides of the moonroof opening.

8. An auxiliary lighting mounting system for a vehicle, comprising:
a first bracket comprising:
a hook portion configured for coupling to a first lateral side of a rim of a moonroof opening; and
a first mounting portion;
a second bracket comprising:
a hook portion configured for coupling to a second lateral side of the rim of the moonroof opening; and
a second mounting portion; and
a support member comprising a first leg member, a second leg member, and an elongated rail extending between the first and second leg members, wherein the elongated rail is coupled with the first mounting portion and the second mounting portion and the first and second leg members extend from the elongated rail to press against an outer surface of a roof panel of the vehicle.

9. The system in accordance with claim 8, wherein the support member at least one of includes integrated lighting elements or is coupled to lighting elements.

10. The system in accordance with claim 8 further comprising a first buffer pad between each bracket and the rim.

11. The system in accordance with claim 8 further comprising a second buffer pad between the portion of the support member and the roof panel.

12. The system in accordance with claim 8 further comprising a length of electrical wire extending through the moonroof opening, wherein the electrical wire has a circumferentially asymmetric or flat cross-sectional shape.

13. A method of mounting an auxiliary lighting system to a vehicle including a roof panel having a moonroof opening and a rim extending about the moonroof opening, the method comprising:
coupling at least two brackets to the roof panel, each bracket includes a first end that defines a hook portion and a second end that defines a mounting portion, the hook portion coupled to a lower edge of the rim such that the mounting portion extends through the moonroof opening;
coupling an auxiliary roof lighting system assembly to the mounting portion of the at least two brackets, the auxiliary roof lighting system assembly including at least one leg member oriented to couple to the roof panel;
coupling a fastener to the at least two brackets and the auxiliary roof lighting system assembly; and
tightening the fastener such that the hook portion is secured to the rim and the auxiliary roof lighting system assembly is secured to the roof panel, wherein tightening the fastener comprises holding the hook portion and the auxiliary roof lighting system assembly in tensioning equilibrium with the fastener.

14. The method in accordance with claim 13, wherein coupling an auxiliary roof lighting system assembly comprises coupling the auxiliary roof lighting system assembly that includes an auxiliary light bar coupled to a support member.

15. The method in accordance with claim 14, wherein coupling the auxiliary roof lighting system assembly comprises coupling the auxiliary roof lighting system assembly that includes the auxiliary light bar coupled to an elongated rail.

16. The method in accordance with claim 13 further comprising positioning a first buffer pad between each bracket and the rim.

17. The method in accordance with claim 13, wherein coupling at least two brackets to the roof panel comprises positioning a first bracket and a second bracket of the at least two brackets on opposing lateral sides of the moonroof opening.

18. The method in accordance with claim 13 further comprising routing a length of electrical wire between the auxiliary roof lighting system assembly and a power source, wherein the electrical wire has a circumferentially asymmetric or flat cross-sectional shape configured such that the electrical wire does not interfere with operation of a movable closure panel.

19. The system in accordance with claim 8 further comprising a fastener coupled between the first and second brackets and the support member, the fastener configured to hold the first and second brackets and the support member in tensioning equilibrium.

* * * * *